United States Patent
Dyson et al.

(10) Patent No.: US 12,385,401 B2
(45) Date of Patent: Aug. 12, 2025

(54) CERAMIC MATRIX COMPOSITE COMPONENT INCLUDING COOLING CHANNELS AND METHOD OF PRODUCING

(71) Applicant: General Electric Company, Schenectady, NY (US)

(72) Inventors: Thomas Earl Dyson, Niskayuna, NY (US); Matthew Harper Hockemeyer, Niskayuna, NY (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/322,856

(22) Filed: May 24, 2023

(65) Prior Publication Data

US 2023/0313689 A1    Oct. 5, 2023

Related U.S. Application Data

(63) Continuation of application No. 16/723,059, filed on Dec. 20, 2019, now Pat. No. 11,680,488.

(51) Int. Cl.
| | | |
|---|---|---|
| *F01D 5/18* | (2006.01) | |
| *C04B 35/71* | (2006.01) | |
| *F01D 25/12* | (2006.01) | |

(52) U.S. Cl.
CPC .............. *F01D 5/18* (2013.01); *C04B 35/71* (2013.01); *F01D 25/12* (2013.01); *F05D 2260/221* (2013.01); *F05D 2300/6033* (2013.01)

(58) Field of Classification Search
CPC ........ C04B 35/62844; C04B 35/63468; C04B 35/638; C04B 35/64; C04B 35/71; C04B 35/80; F01D 5/186; F01D 9/065; F05D 2230/10; F05D 2300/6033

See application file for complete search history.

(56) References Cited

U.S. PATENT DOCUMENTS

| | | |
|---|---|---|
| 7,198,458 B2 | 4/2007 | Thompson |
| 7,255,535 B2 | 8/2007 | Albrecht et al. |
| 8,257,809 B2 | 9/2012 | Morrison et al. |
| 10,017,425 B2 | 7/2018 | Tuertscher et al. |
| 10,642,073 B2 | 5/2020 | Makikawa et al. |

(Continued)

FOREIGN PATENT DOCUMENTS

JP    2019085310 A    6/2019

*Primary Examiner* — Alex B Efta
(74) *Attorney, Agent, or Firm* — Dority & Manning, P.A.

(57) ABSTRACT

A ceramic matrix composite component and method of fabrication including a plurality of longitudinally extending ceramic matrix composite plies in a stacked configuration forming a densified body and one or more elongate functional features formed therein and in alignment with the plurality of longitudinally extending ceramic matrix composite plies. Each of the elongate functional features includes an inlet configured to be in fluid communication with a flow of cooling fluid from a fluid source. One or more bores cut through the plurality of ceramic matrix composite plies from at least one of the one or more elongate functional features to an outlet proximate to an outer surface of the ceramic matrix composite component. One or more film cooling throughholes cut through the ceramic matrix composite plies from an inner surface of the ceramic matrix composite component to an outlet proximate to the outer surface of the ceramic matrix composite component.

9 Claims, 5 Drawing Sheets

(56) References Cited

U.S. PATENT DOCUMENTS

| | | | |
|---|---|---|---|
| 2002/0076541 A1* | 6/2002 | Jarmon | F23R 3/007 |
| | | | 264/44 |
| 2003/0059577 A1* | 3/2003 | Morrison | B32B 3/18 |
| | | | 428/188 |
| 2005/0118392 A1* | 6/2005 | Millard | C04B 35/14 |
| | | | 428/131 |
| 2012/0279631 A1 | 11/2012 | Mizokami et al. | |
| 2013/0309079 A1 | 11/2013 | Allen et al. | |
| 2017/0101873 A1* | 4/2017 | Morgan | B32B 18/00 |
| 2017/0122113 A1 | 5/2017 | Kittleson et al. | |
| 2017/0362941 A1 | 12/2017 | Craig, III | |
| 2018/0272568 A1 | 9/2018 | Parolini et al. | |
| 2018/0328189 A1 | 11/2018 | Frey et al. | |
| 2019/0106990 A1 | 4/2019 | Subramanian et al. | |
| 2020/0362709 A1* | 11/2020 | Whittle | F01D 5/284 |

\* cited by examiner

CERAMIC MATRIX COMPOSITE COMPONENT INCLUDING COOLING CHANNELS AND METHOD OF PRODUCING

CROSS-REFERENCE TO RELATED APPLICATIONS

This application is a continuation application of U.S. application Ser. No. 16/723,059 filed Dec. 20, 2019, which is hereby incorporated by reference in its entirety.

FIELD

The present invention relates generally to gas turbines for power generation and more specifically to methods of forming ceramic matrix composite components for hot gas path turbine components for gas turbines.

BACKGROUND

Silicon carbide (SiC)-based ceramic matrix composite (CMC) materials have been proposed as materials for certain components of gas turbine engines, such as the turbine blades, vanes, nozzles, shrouds and buckets. Various methods are known for fabricating SiC-based components, including Silicomp, melt infiltration (MI), chemical vapor infiltration (CVI), polymer inflation pyrolysis (PIP), and oxide/oxide methods. Though these fabrication techniques significantly differ from each other, each involves the use of hand lay-up and tooling or dies to produce a near-net-shape part through a method that includes the application of heat at various method stages.

As with turbine blades and vanes formed from more conventional superalloy materials, CMC blades, vanes and shrouds are primarily equipped with cavities and cooling voids to reduce weight, reduce centrifugal load, and reduce operating temperatures of the components. These features are typically formed in CMC components using a combination of removable and expendable tooling, drilling or the like. Internal cooling channels are advantageous for cooling the both metal and CMC hot-gas path hardware as they reduce cooling flow requirements and thermal gradients/stress.

In many instances, the CMC gas turbine components are subject to extreme conditions in the form of extreme thermal gradients and high temperatures. Even with the inclusion of cavities and cooling voids in the CMC component as previously described, the extreme conditions may drive crack formation, coating spallation, and recession in the CMC components. Reduced service life from these problems prevents CMC components from realizing their full potential.

Accordingly, there is a need for a ceramic matrix composite component and method of producing a ceramic matrix composite component that provide improved cooling to the CMC gas turbine components when subject to extreme conditions, such as extreme thermal gradients and high temperatures.

BRIEF DESCRIPTION

Aspects and advantages of the disclosure will be set forth in part in the following description, or may be obvious from the description, or may be learned through practice of the disclosure.

A ceramic matrix composite (CMC) component is generally provided, along with a method of forming the ceramic matrix composite component. In one embodiment, the ceramic matrix composite component includes: a plurality of longitudinally extending ceramic matrix composite plies in a stacked configuration forming a densified body; one or more elongate functional features formed therein the densified body, and in alignment with the plurality of longitudinally extending ceramic matrix composite plies, and one or more bores cutting through the plurality of longitudinally extending ceramic matrix composite plies from at least one of the one or more elongate functional features to an outlet proximate to an outer surface of the ceramic matrix composite component. Each of the one or more elongate functional features includes an inlet in fluid communication with a flow of cooling fluid from a fluid source; and In an alternate embodiment, the ceramic matrix composite component includes a plurality of longitudinally extending ceramic matrix composite plies in a stacked configuration forming a densified body; one or more elongate functional features formed therein the densified body, and one or more bores cutting through the plurality of longitudinally extending ceramic matrix composite plies from at least one of the one or more elongate functional features to an outlet proximate to an outer surface of the ceramic matrix composite to form at least one cooling channel. Each of the one or more elongate functional features includes an inlet in fluid communication with a flow of cooling fluid from a fluid source. At least one of the one or more elongate functional features is configured to retain the flow of fluid from the fluid source in the elongate functional feature to form an insulating channel.

In yet another embodiment, the method of forming a ceramic matrix composite product includes forming a CMC preform comprising a matrix precursor, a plurality of reinforcing fibers and a plurality of sacrificial fibers; performing one of: removing the plurality of sacrificial fibers such that one or more elongate functional features are formed in the CMC preform in fluid communication with a source of cooling fluid flow; or applying a fluid infiltrant to the CMC preform thereby densifying the CMC preform, performing the other of: removing the plurality of sacrificial fibers such that one or more elongate functional features are formed in the CMC preform in fluid communication with a source of cooling fluid flow; or applying a fluid infiltrant to the CMC preform thereby densifying the CMC preform, and forming one or more bores cutting through the plurality of longitudinally extending ceramic matrix composite plies from at least one of the one or more elongate functional features to an outlet proximate to an outer surface of the ceramic matrix composite component to provide a flow of fluid from the fluid source to an exterior of the ceramic matrix composite component and form one or more cooling channels.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure, including the best mode thereof, directed to one of ordinary skill in the art, is set forth in the specification, which makes reference to the appended drawings, in which.

Wherever possible, the same reference numbers will be used throughout the drawings to represent the same parts.

DETAILED DESCRIPTION

Figure 1:
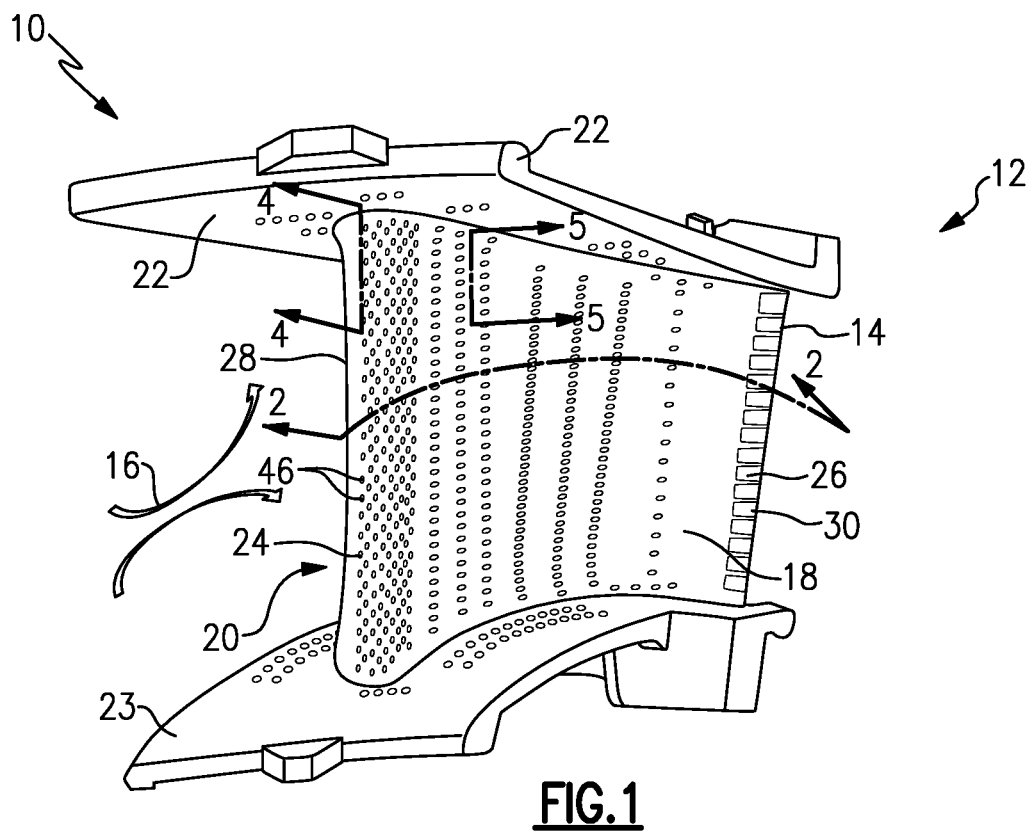
FIG. 1 is a perspective view of a ceramic matrix component (CMC), and more particularly, a CMC nozzle, in accordance with one or more embodiments disclosed herein.

Embodiments of the present disclosure, for example, in comparison to concepts failing to include one or more of the features disclosed herein, enable the formation of one or more cooling channels in a CMC airfoil component, wherein the channels are configured in alignment with the one or more CMC layers. The inclusion of the cooling channels in alignment with the one or more CMC layers provides for maintenance of the component structural integrity. The CMC airfoil component further includes one or more insulating channels or one or more film cooling holes. The method, according to the present disclosure, has decreased complexity with low cost, and more efficient cooling with the ability to reduce the cooling demand and flow-rate of the part When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

In the present disclosure, when a layer is being described as "on" or "over" another layer or substrate, it is to be understood that the layers can either be directly contacting each other or have another layer or feature between the layers, unless expressly stated to the contrary. Thus, these terms are simply describing the relative position of the layers to each other and do not necessarily mean "on top of" since the relative position above or below depends upon the orientation of the device to the viewer.

Chemical elements are discussed in the present disclosure using their common chemical abbreviation, such as commonly found on a periodic table of elements. For example, Hydrogen would be represented by its common chemical abbreviation H; Helium would be represented by its common chemical abbreviation He; and so forth.

As used herein, the "average particle diameter" or "average fiber diameter" refers to the diameter of a particle or fiber such that about 50% of the particles or fibers have a diameter that is greater than that diameter, and about 50% of the particles or fibers have a diameter that is less than that diameter.

As used herein, "substantially" refers to at least about 90% or more of the described group. For instance, as used herein, "substantially all" indicates that at least about 90% or more of the respective group have the applicable trait and "substantially no" or "substantially none" indicates that at least about 90% or more of the respective group do not have the applicable trait. As used herein, the "majority" refers to at least about 50% or more of the described group. For instance, as used herein, "the majority of" indicates that at least about 50% or more of the respective group have the applicable trait.

A ceramic matrix composite product (a "CMC product"), particularly a ceramic matrix composite product formed from melt infiltration, is generally provided herein, along with methods of forming such product. The CMC product is formed a plurality of ply layers including one or more elongated functional features formed in alignment with the plurality of ply layers, in combination with one or more insulating channels formed in alignment with the plurality of ply layers, or one or more film cooling holes, in combination enhancing the function of the CMC component.

Systems used to generate power include, but are not limited to, gas turbines, steam turbines, and other turbine assemblies, such as land based aero-derivatives, used for power generation. In certain applications, the power generation systems, including the turbomachinery therein (e.g., turbines, compressors, and pumps) and other machinery, may include components that are exposed to heavy wear conditions. For example, certain power generation system components, such as blades, buckets, casings, rotor wheels, shafts, shrouds, nozzles, and so forth, may operate in high heat and/or high revolution environments. These components are manufactured using ceramic matrix composites and these components may also include cooling passages and insulating passages. The present disclosure provides a CMC component including one or more cooling passages or channels, and a method of forming the ceramic matrix composite (CMC) components. An exemplary embodiment of the disclosure is shown in FIGS. 1-6 as a turbine airfoil, and more particularly a nozzle or turbine blade, but the present disclosure is not limited to the illustrated structures.

Figure 2:
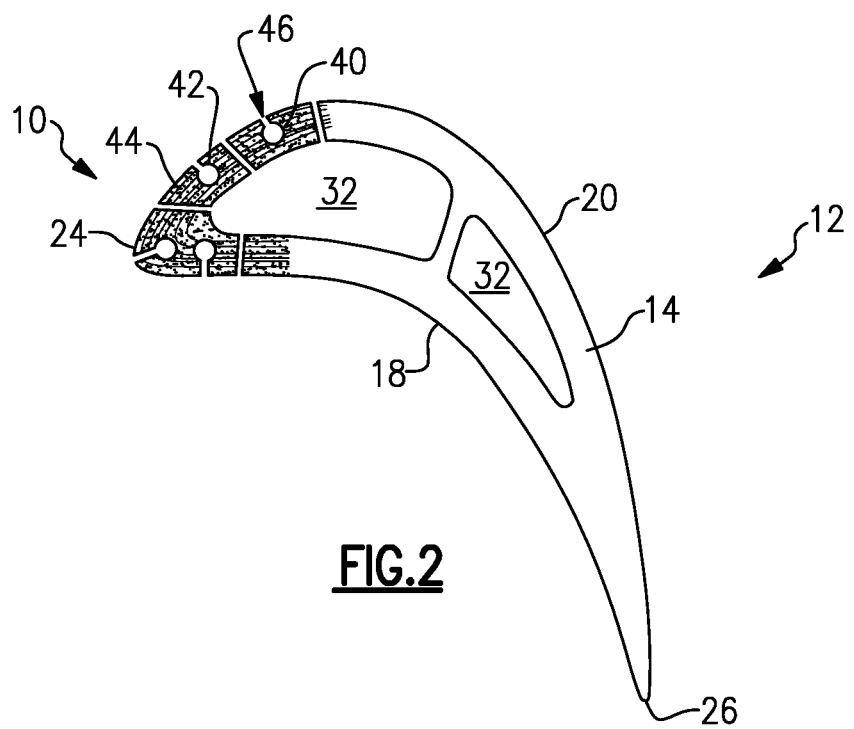
FIG. 2 is a sectional view taken in direction 2-2 of FIG. 1 of the ceramic matrix composite (CMC) component of FIG. 1, in accordance with one or more embodiments disclosed herein.

Referring now to FIGS. 1 and 2, illustrated in FIG. 1 is a perspective view of a component 10, such as, but not limited to, a turbine nozzle segment 12, including a turbine airfoil 14. Illustrated in FIG. 2 is a side cross-sectional view of the nozzle segment 12 taken through line 2-2 of FIG. 1, Although FIGS. 1 and 2 show a turbine nozzle segment 12, other suitable components, according to the present disclosure, include, but are not limited to, a combustor liner, a blade, a nozzle end wall/band, a blade platform, a shroud or other hot gas path component. Component 10 is preferably formed of a ceramic matrix composite (CMC) material.

As used herein, ceramic matrix composite or "CMCs" refers to composites comprising a ceramic matrix reinforced by ceramic fibers. Some examples of CMCs acceptable for use herein can include, but are not limited to, materials having a matrix and reinforcing fibers comprising oxides, carbides, nitrides, oxycarbides, oxynitrides and mixtures thereof. Examples of non-oxide materials include, but are not limited to, CMCs with a silicon carbide matrix and silicon carbide fiber (when made by silicon melt infiltration, this matrix will contain residual free silicon); silicon carbide/silicon matrix mixture and silicon carbide fiber; silicon nitride matrix and silicon carbide fiber; and silicon carbide/silicon nitride matrix mixture and silicon carbide fiber. Furthermore, CMCs can have a matrix and reinforcing fibers comprised of oxide ceramics. Specifically, the oxide-oxide CMCs may be comprised of a matrix and reinforcing fibers comprising oxide-based materials such as aluminum oxide ($Al_2O_3$), silicon dioxide ($SiO_2$), aluminosilicates, and mixtures thereof. Accordingly, as used herein, the term "ceramic matrix composite" includes, but is not limited to, carbon-fiber-reinforced carbon (C/C), carbon-fiber-reinforced silicon carbide (C/SiC), and silicon-carbide-fiber-reinforced silicon carbide (SiC/SiC). In one embodiment, the ceramic matrix composite material has increased elongation, fracture toughness, thermal shock, and anisotropic properties as compared to a (non-reinforced) monolithic ceramic structure.

There are several methods that can be used to fabricate SiC—SiC CMCs. In one approach, the matrix is partially formed or densified through melt infiltration (MI) of molten silicon or silicon containing alloy into a CMC preform. In another approach, the matrix is at least partially formed through chemical vapor infiltration (CVI) of silicon carbide into a CMC preform. In a third approach, the matrix is at least partially formed by pyrolyzing a silicon carbide yielding pre-ceramic polymer. This method is often referred to as polymer infiltration and pyrolysis (PIP). Combinations of the above three techniques can also be used.

In one example of the MI CMC process, a boron-nitride based coating system is deposited on SiC fiber. The coated fiber is then impregnated with matrix precursor material in order to form prepreg tapes. One method of fabricating the tapes is filament winding. The fiber is drawn through a bath of matrix precursor slurry and the impregnated fiber wound on a drum. The matrix precursor may contain silicon carbide and or carbon particulates as well as organic materials. The impregnated fiber is then cut along the axis of the drum and is removed from the drum to yield a flat prepreg tape where the fibers are nominally running in the same direction. The resulting material is a unidirectional prepreg tape. The prepreg tapes can also be made using continuous prepregging machines or by other means. The tape can then be cut into shapes, layed up, and laminated to produce a preform. The preform is pyrolyzed, or burned out, in order to char any organic material from the matrix precursor and to create porosity. Molten silicon is then infiltrated into the porous preform, where it can react with carbon to form silicon carbide. Ideally, excess free silicon fills any remaining porosity and a dense composite is obtained. The matrix produced in this manner typically contains residual free silicon.

The prepreg MI process generates a material with a two-dimensional fiber architecture by stacking together multiple one-dimensional prepreg plies where the orientation of the fibers is varied between plies. Plies are often identified based on the orientation of the continuous fibers. A zero degree orientation is established, and other plies are designed based on the angle of their fibers with respect to the zero degree direction. Plies in which the fibers run perpendicular to the zero direction are known as 90 degree plies, cross plies, or transverse plies.

The MI approach can also be used with two-dimensional or three-dimensional woven architectures. An example of this approach would be the slurry-cast process, where the fiber is first woven into a three-dimensional preform or into a two-dimensional cloth. In the case of the cloth, layers of cloth are cut to shape and stacked up to create a preform. A chemical vapor infiltration (CVI) technique is used to deposit the interfacial coatings (typically boron nitride based or carbon based) onto the fibers. CVI can also be used to deposit a layer of silicon carbide matrix. The remaining portion of the matrix is formed by casting a matrix precursor slurry into the preform, and then infiltrating with molten silicon.

An alternative to the MI approach is to use the CVI technique to densify the Silicon Carbide matrix in one-dimensional, two-dimensional or three-dimensional architectures. Similarly, PIP can be used to densify the matrix of the composite. CVI and PIP generated matrices can be produced without excess free silicon. Combinations of MI, CVI, and PIP can also be used to densify the matrix.

Component 10, and more particularly the nozzle segment 12, includes a plurality of circumferentially spaced airfoil shaped hollow vanes, of which only one is illustrated and referred to herein as airfoil 14, that are supported between arcuate, segmented outer bands 22 and inner bands 23 (of which only one of each is shown), also referred to herein as endwalls. The airfoil 14, the outer band 22 and the inner band 23 are arranged into a plurality of circumferentially adjoining nozzle segments 12 that collectively form a complete 360° assembly.

It should be noted that the construction of the nozzle segment 12 is used merely as an example, and the principles of the present invention are applicable to any turbine airfoil. As indicated, FIG. 1 illustrates a single nozzle segment 12, including a single airfoil 14 against which a flow of hot exhaust gas 16 is directed. The airfoil 14 includes widthwise spaced apart airfoil pressure and suction sides 18, 20 extending heightwise or spanwise and outwardly between opposed nozzle end walls, or bands, 22 and 23. The exemplary airfoil pressure and suction sides 18, 20 illustrated herein may be concave and convex respectively. The airfoil 14 includes lengthwise or chordwise spaced apart airfoil leading and trailing edges 24, 26 at or near forward and aft ends 28, 30 of the airfoil 14. A chord C (not shown) is defined between the airfoil leading edge 24 and the airfoil trailing edge 26 of the airfoil cross section.

FIG. 2 is a sectional view of the component 10 taken in direction 2-2 of FIG. 1 showing one or more functional features 40, described presently, and more particularly one or more cooling channels 42 formed in the component 10. A plurality of ceramic matrix composite (CMC) plies 44 (only a few have been shown for clarity) are illustrated. The plurality of functional features 40 extend in alignment with the ceramic matrix composite plies 44 (described presently). Each functional feature 40 is in fluid communication (described presently with a source of cooling fluid via an inlet (described presently) and exterior the component 10 via an outlet 46 (FIG. 1). In an alternate embodiment, at least one of the plurality of functional features 40 may be in fluid communication with a plenum 32 defined within the airfoil 14.

Figure 3:
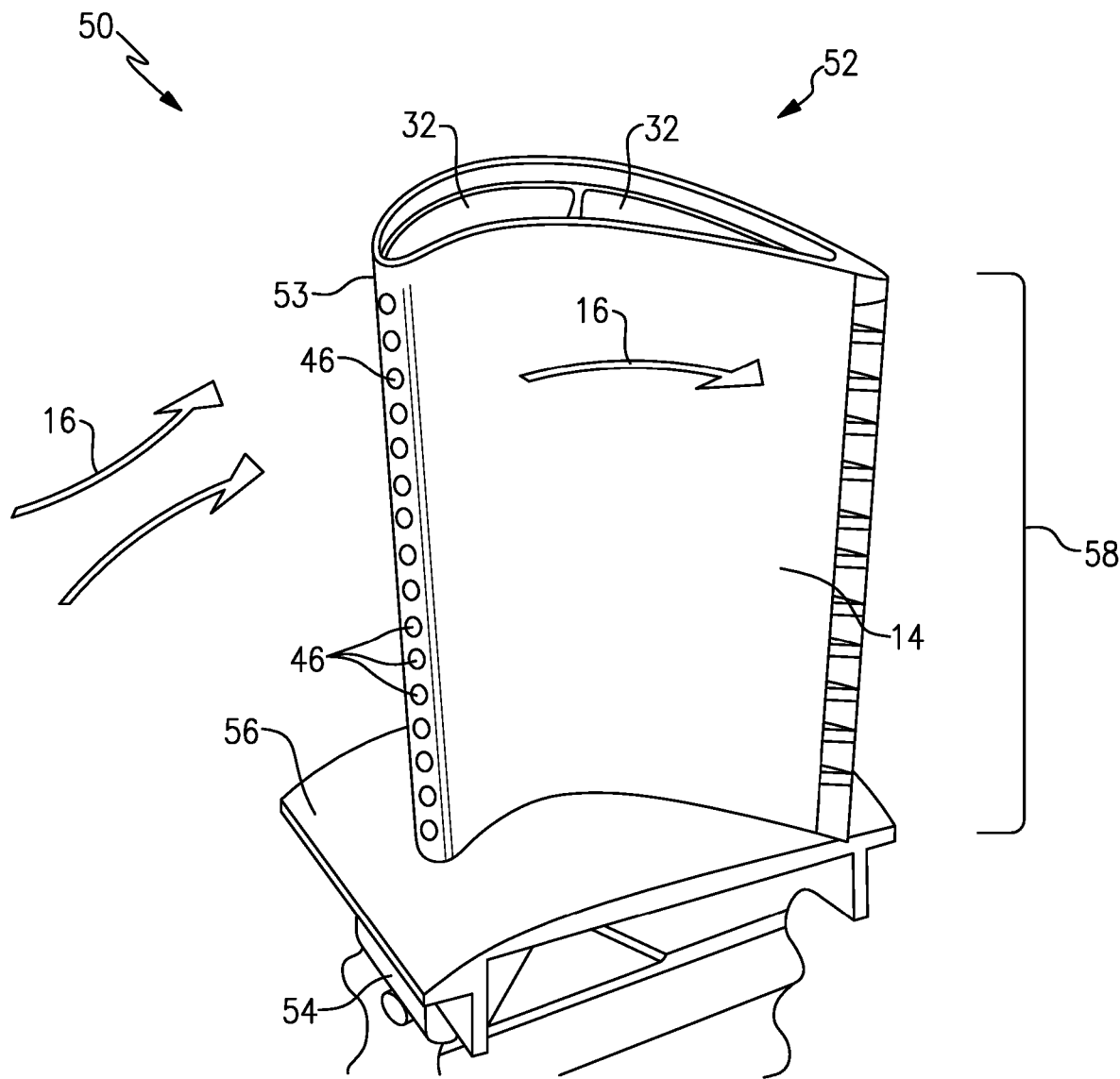
FIG. 3 is a perspective view of another embodiment of a ceramic matrix component (CMC), and more particularly, a CMC blade, in accordance with one or more embodiments disclosed herein.

Referring now to FIG. 3, illustrated is an alternate embodiment of the CMC component described herein. It again is noted, the same reference numbers will be used throughout the drawings to represent the same parts. In the embodiment of FIG. 3, illustrated is a component 50, such as, but not limited to, a turbine rotor segment 52, including an airfoil 14. Although FIG. 3 shows a turbine rotor segment 52, as previously stated, other suitable components, according to the present disclosure, include, but are not limited to, a combustor liner, a blade, a nozzle end wall/band, a blade platform, a shroud or other hot gas path component. Similar to the component 10 of FIGS. 1 and 2, the component 50 is preferably formed of a ceramic matrix composite (CMC) material.

In the embodiment of FIG. 3, the CMC component 50 includes an airfoil 14 against which a flow of hot exhaust gas 16 is directed. The airfoil 14 extends from a tip 53 to a dovetail 54. Component 50 is mounted to a turbine disk (not shown) by the dovetail 54 which extends downwardly from the airfoil 14 and engages a slot on the turbine disk. A platform 56 extends laterally outwardly from the area where the airfoil 14 is joined to the dovetail 54. The component 50 includes at least one plenum 32 extending along the interior of the airfoil 14. During operation of a power generation system, a flow of cooling air (not shown) is directed through the plenum 32 to reduce the temperature of the airfoil 14.

The component 10, and more specifically the airfoil 14, includes widthwise spaced apart airfoil pressure and suction sides 18, 20 extending heightwise or spanwise and outwardly from the airfoil platform 56 along an airfoil span 58 to the airfoil tip 53. Similar to the airfoil 14 of FIGS. 1 and 2, the airfoil pressure and suction sides 18, 20 illustrated in this particular embodiment may be concave and convex respectively. The airfoil 14 includes a lengthwise or chordwise spaced apart airfoil leading edge 24 and a trailing edge 26 at or near a forward 28 and an aft end 30, respectively, of the airfoil 14. It should be noted herein that a first edge of the airfoil 14 to contact the incoming gases 16 is referred to herein as the leading edge 24 and a second edge that contacts the hot exhaust gas 16 as the hot exhaust gas 16 flows past the airfoil 14 is referred to as the trailing edge 26. A chord C (not shown) is defined as a line between the airfoil leading edge 24 and trailing edge 26 of a cross section of the airfoil 14.

Similar to the previous embodiment, the component 50 includes one or more functional features (not shown), and more particularly one or more cooling channels formed in the component 50. The component 50 is comprised of a plurality of ceramic matrix composite (CMC) plies 44 with the plurality of functional features 40 extending in alignment with the ceramic matrix composite plies 44. Each functional feature is in fluid communication (described presently with the plenum 32 defined within the airfoil 14 via an inlet (described presently) and exterior the component 50 via an outlet 46. In an alternate embodiment, at least one of the plurality of functional features 40 may be in fluid communication with an alternative source of a cooling fluid.

Figure 4:
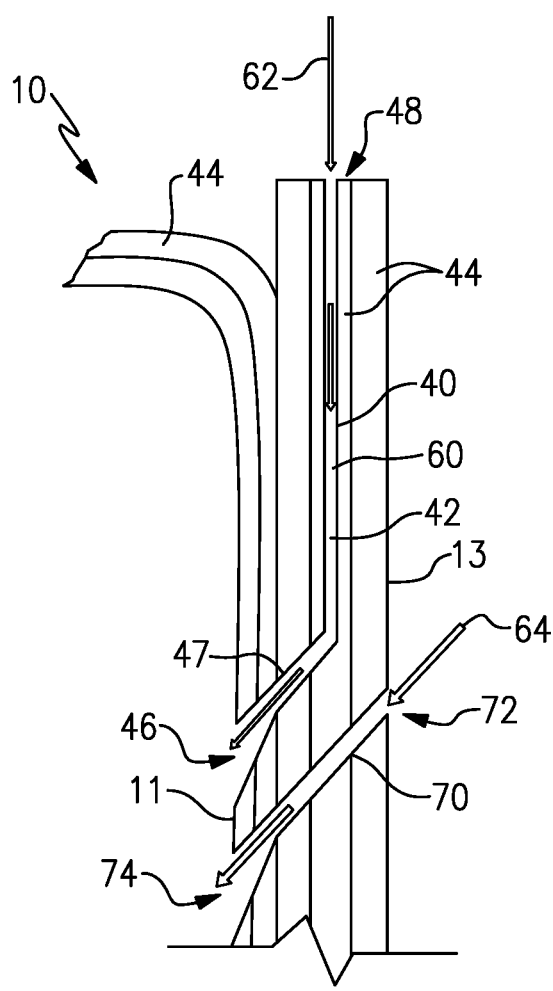
FIG. 4 is a schematic sectional view taken in direction 4-4 of FIG. 1 of a portion of the ceramic matrix composite (CMC) component of FIG. 1, in accordance with one or more embodiments disclosed herein.

Referring now to FIG. 4, illustrated is a schematic sectional view of a portion of the component 10 taken through line 4-4 in FIG. 1, illustrating the plurality of CMC plies 44. In this disclosed embodiment, one or more of the plurality of CMC plies 44 has formed therein one or more functional features 40 (of which only one is illustrated in FIG. 4). In an embodiment, the functional feature 40 is an elongate channel that serves as a cooling manifold 60 for the passage therethrough of a cooling fluid flow 62, also referred to herein as fluid flow 62.

During the process of laying down the plurality of CMC plies 44 and fabrication of the functional features 40 (described presently), the inlet 48 for each functional feature 40 is formed. Each of the plurality of functional features 40 extends from a respective inlet 48 through the CMC plies 44, and in alignment therewith the CMC plies 44. The inlet 48 provides for an input of the cooling fluid flow 62.

Subsequent to laying down the plurality of CMC plies 44 and fabrication of the functional features 40, the outlet 46 for each functional feature 40 is formed proximate to an outer surface 11 of the ceramic matrix composite component 10, such as by drilling a bore 47 through the plurality of CMC plies 44, in a substantially cut-ply configuration, so as to cut through the plurality of CMC plies 44 and fluidly couple the functional feature 40 to an exterior of the ceramic matrix composite component 10. The inlet 48, the functional feature 40, the bore 47 and the outlet 46 define a cooling channel 42 through the CMC plies 44 sufficient to permit flow of the cooling fluid flow 62 therethrough.

In addition, and optionally, one or more film cooling throughholes 70 (of which only one is illustrated) are formed, such as by drilling through the plurality of CMC plies 44, so as to cut through the plies 44 and to provide additional cooling of the component surface. Each of the one or more film cooling throughholes 70 extends from an inlet 72 disposed flush at an inner surface 13 of the ceramic matrix composite component 10 to an outlet 74 disposed flush at the outer surface 11 of the ceramic matrix composite component 10. A portion of the pressurized air from the compressor is directed through the one or more film cooling throughholes 70, entering through the inlet 72, as an additional cooling fluid flow 64, and exiting at the outlet 74. Each of the plurality of film cooling throughholes 70 forms an opening through the plurality of CMC plies 44 of sufficient dimension to permit the flow of additional cooling fluid flow 64 therethrough. In an embodiment, the plurality of film cooling throughholes 70 can be interleaved with the functional features 40 that form cooling channels 42 having warmer air to mitigate cold spots caused by the film cooling throughholes 70. Additionally, the functional features 40 that form cooling channels 42 may be sufficiently sized to feed multiple outlets 46 (described presently). By carefully laying out the position of the cooling channel outlets 46 and the plurality of film cooling throughholes 70, a surface film temperature can be made more uniform. More specifically, colder film cooling fed by the plurality of film cooling throughholes 70 (shorter paths) can configured downstream of hotter film cooling, fed by the plurality of cooling channels 42, producing an overall film temperature that is more even.

In the illustrated embodiment, each of the functional features 40 and the plurality of film cooling throughholes 70 are open to and fluidly communicate with a source of cooling fluid flow, and to the exterior of the component 10. In contrast to known prior art, by forming the plurality of functional features 40, and more specifically, the plurality of cooling channels 42 between the plurality of CMC plies 44, the overall strength of the CMC plies 44 and resultant component 10 is not weakened and allows finer control of local cooling rates than traditional cooling features. In addition, relatively small cooling channels, such as cooling channels 42, having longer flow-paths than traditional film cooling holes, such as the plurality of film cooling throughholes 70, make use of more of the available heat capacity in the cooling fluid flow 62, allowing reduction of flows. Routing the cooling fluid flow 62 from the cooling source through the regions of the airfoil 14 that experience the greatest thermal gradient induced stresses, and placement of the plurality of functional features 40 as disclosed herein helps to balance surface temperatures and provide novel means of gradient/stress mitigation.

In the embodiment of FIG. 4, the arrangement of ceramic matrix composite plies 44, the functional feature 40, the cooling channel 32, the inlet 48, the outlet 46 and the film cooling throughhole 70 are schematic and have been enlarged for illustration purposes. The size and geometry of the CMC plies and voids are not limited to those shown in FIG. 4.

Figure 5:
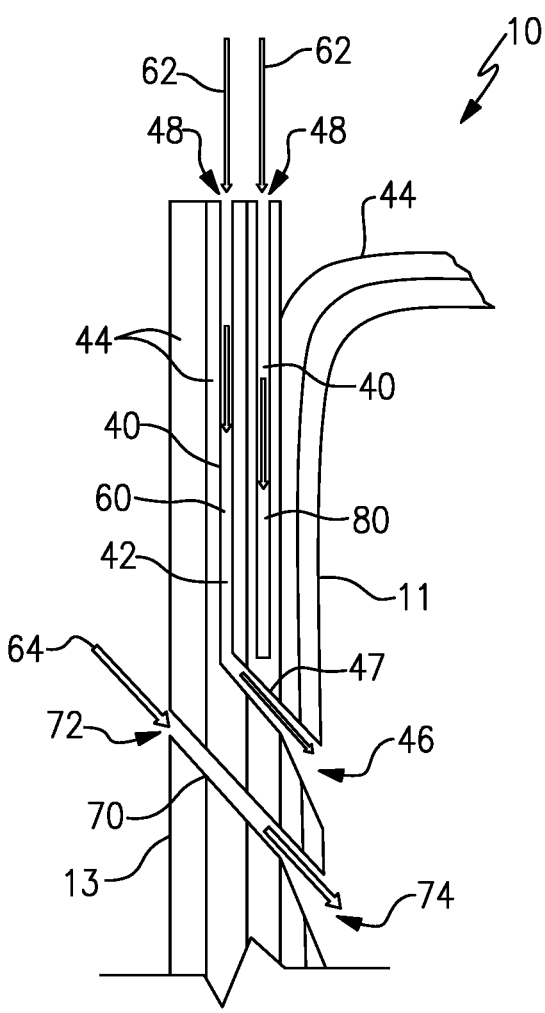
FIG. 5 is a schematic sectional view taken in direction 5-5 of FIG. 1 of a portion of the ceramic matrix composite (CMC) component of FIG. 1, in accordance with one or more embodiments disclosed herein.

Referring now to FIG. 5, illustrated is a schematic sectional view of another portion of the component 10 taken through line 5-5 in FIG. 1, illustrating the plurality of CMC plies 44. In this disclosed embodiment, one or more of the plurality of CMC plies 44 has formed therein one or more functional features 40 (of which two are illustrated in FIG. 5). In an embodiment, the one or more functional features 40 are configured as elongate channels. More specifically, in the illustrated embodiment, the one or more functional features 40 include a cooling channel 42 that serves as a cooling manifold 60 for the passage therethrough of a cooling fluid flow 62 and an insulating channel 80 that is not in fluid communication with the hot gas path flow 16.

Similar to the embodiment of FIG. 4, during the process of laying down the plurality of CMC plies 44 and fabrication of the functional features 40 (described presently), an inlet 48 for each functional feature 44 is formed. Each of the plurality of functional features 40 extends from a respective inlet 48 through the CMC plies 44, and in alignment therewith the CMC plies 44. The inlet 48 provides for an input of the cooling fluid flow 62.

Subsequent to laying down the plurality of CMC plies 44 and fabrication of the functional features 40, an outlet 46 for each of the functional features 40 that serve as a cooling channel 42, is formed such as by drilling a bore 47 through the plurality of CMC plies 44 so as to cut through the plurality of CMC plies 44, in a substantially cut-ply configuration, and fluidly couple the functional feature 40 to an exterior of the ceramic matrix composite component 10 via the outlet 46. Similar to the embodiment of FIG. 4, the inlet 48, the functional feature 40, the bore 47 and the outlet 46 define a cooling channel 42 through the CMC plies 44 sufficient to permit flow of the cooling fluid flow 62 therethrough. The functional features 40 that serve as insulating channels 80 do not include an outlet and therefore do not provide for the passage therethrough of the cooling fluid 62 to the exterior of the component 10.

In an embodiment, the insulating channels 80 may be formed in different plies 44, providing management of heat pick-up of the cooling fluid low 62 in the cooling channels 42. The insulating channels 80, also described herein as "dead" channels, may also provide a mitigation for EBC spallation/damage. More particularly, configuring an insulating channel 80 very near the hot gas path 16 would cause them to be exposed quickly in the event of a spall. A new path would then become available for the cooling fluid flow 62 reducing the temperature and extending the life of the damaged airfoil 14 until it could be replaced.

In this embodiment, one or more of the plurality of functional features 40 extends from a source of cooling fluid through the CMC plies 44, and in alignment therewith the CMC plies 44, to the outlet 46, and forms the cooling channel 42 through the CMC plies 44 sufficient to permit flow of the cooling fluid flow 62 therethrough. In addition, one or more of the plurality of functional features 40 extends from the source of cooling fluid through the CMC plies 44, and in alignment therewith the CMC plies 44, and does not include the formation of an outlet, and forms the insulating channel 80. Similar to the previous embodiment, optionally one or more film cooling throughholes 70 (of which only one is illustrated) may optionally be formed, such as by drilling through the plurality of CMC plies 44, so as to cut through the plies 44 and to provide sufficient cooling of the airfoil surface. Each of the one or more film cooling throughholes 70 extends from an inlet 72 disposed flush at an inner surface 13 of the ceramic matrix composite component 10 to an outlet 74 disposed flush at the outer surface 11 of the ceramic matrix composite component 10. A portion of the pressurized air from the compressor is directed through the one or more film cooling throughholes 70, entering through the inlet 72, as an additional cooling fluid flow 64, and exiting at the outlet 74. Each of the plurality of film cooling throughholes 70 forms an opening through the plurality of CMC plies 44 of sufficient dimension to permit the flow of additional cooling fluid flow 64 therethrough. In an embodiment, the plurality of film cooling throughholes 70 can be interleaved with the functional features 40 that form the cooling channels 42 and the insulating channel 80 having warmer air to mitigate cold spots caused by the film cooling throughholes 70. As in the previous embodiment, the functional features 40 that form the cooling channels 42 may be sufficiently sized to feed multiple outlets 46 where desired.

In the embodiment of FIG. 5, the arrangement of ceramic matrix composite plies 44, the functional features 40, the cooling channel 42, the outlet 46, the inlets 48, the insulating channel 80, the film cooling throughholes 70, and respective inlet 72 and outlet 74 are schematic and have been enlarged for illustration purposes. The size and geometry of the CMC plies and voids are not limited to those shown in FIG. 5.

Figure 6:
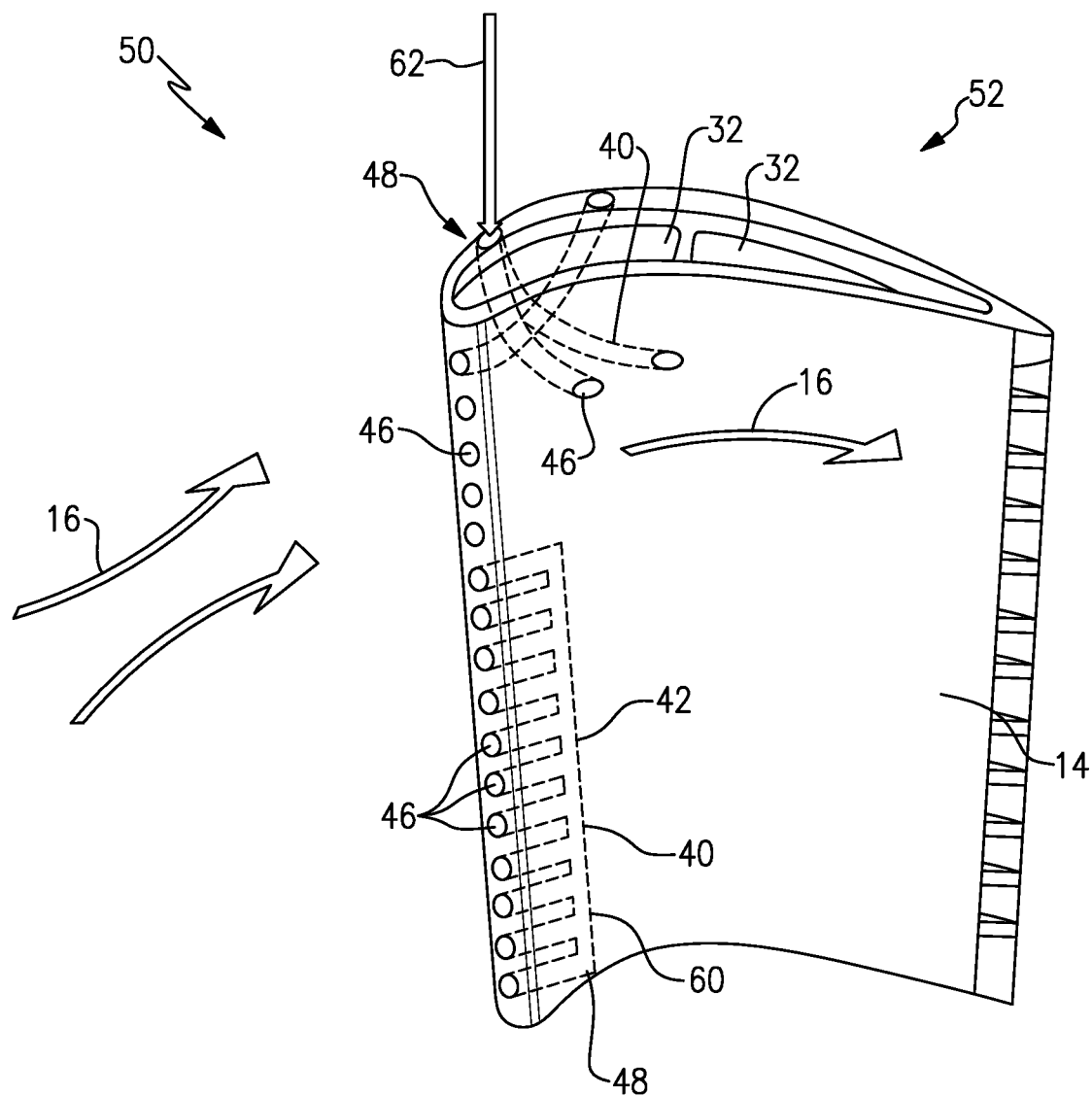
FIG. 6 is a schematic view of a portion of the ceramic matrix composite (CMC) component of FIG. 3, illustrating one or more functional features in hidden line, in accordance with one or more embodiments disclosed herein.

Referring now to FIG. 6, illustrated is a portion of the airfoil 14 of FIG. 3, illustrating alternative layouts for the one or more functional features 40, and more particularly the cooling channels 42. As illustrated, the functional features 40 may be configured with one or more turns connecting to the platform 56 (FIG. 3), or bands, such as the outer band 22 (FIG. 1) and/or inner band 23 (FIG. 1) of the nozzle segment 12. The functional features 40 configured as such may be formed by laying curved or angled slots in the plies 44, forming the functional features in multiple layers or drilling openings to intersect with pre-formed channels. Forming the functional features 40 in multiple layers provides the cooling channels 42 to cover more hot area from the limited surface access in the platform 56, and/or bands 22, 23. Fabrication of functional features in multiple layers are discussed in U.S. patent spplication Ser. No. 16/723,011, filed Dec. 20, 2019, T. Dyson, et al., "Ceramic Matrix Composite Component Including Cooling Channels in Multiple Layers and Method of Producing", filed simultaneously herewith, and which is incorporated herein in its entirety.

In addition, as illustrated in FIG. 6, the functional features 40 that form the cooling channels 42 may be sufficiently sized to feed multiple outlets 46, thereby acting as a cooling manifold 60. More specifically, each cooling channel 42, having a single inlet 48 may be fluidly coupled to a plurality of outlets 46.

In the embodiment of FIG. 6, the arrangement of the functional features 40, the cooling channels 42, the outlets 46, the inlets 48 and the film cooling throughholes 70 are schematic and have been enlarged for illustration purposes.

The size and geometry of the CMC plies and voids are not limited to those shown in FIG. 6.

Figure 7:
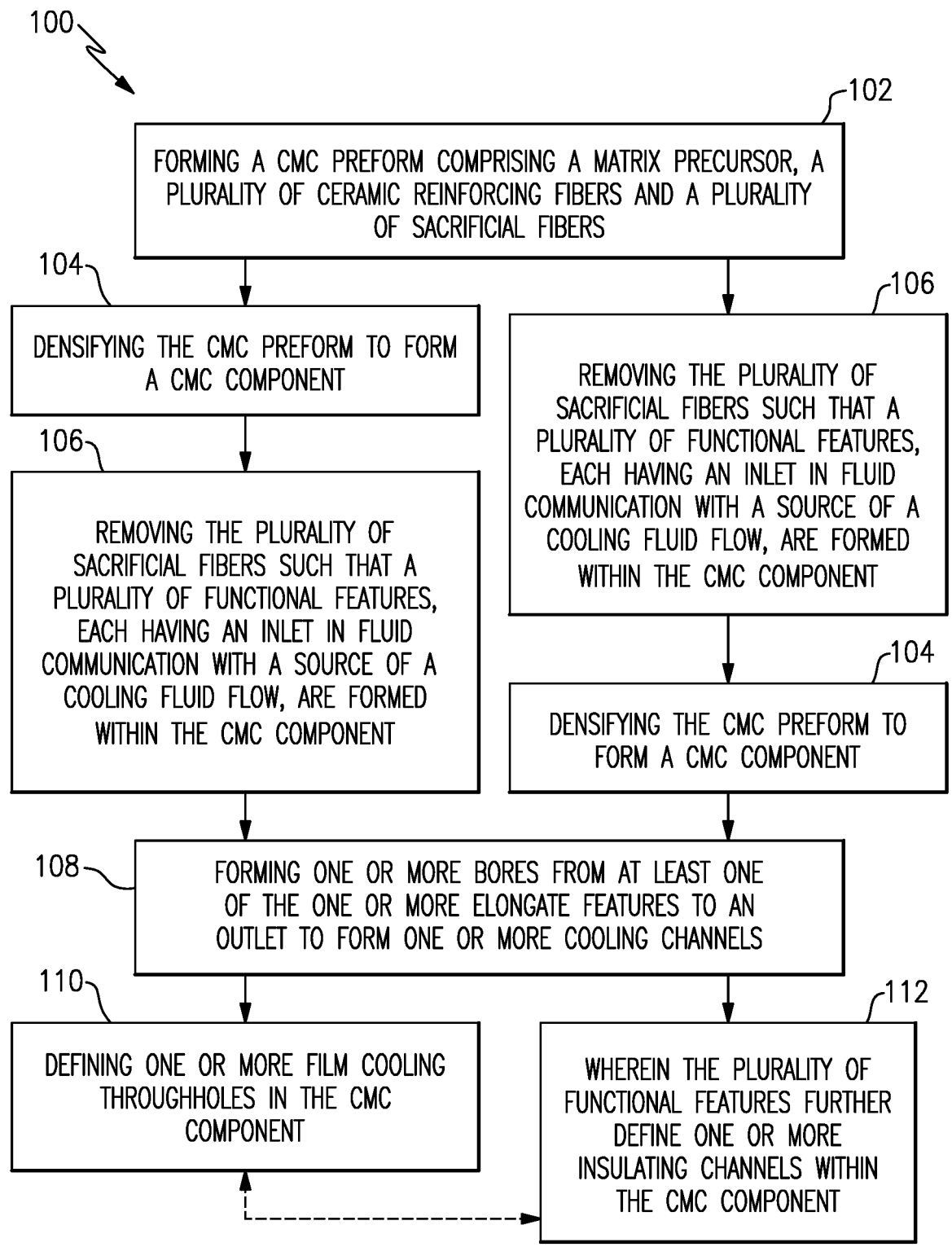
FIG. 7 schematically shows a method for forming a CMC component, in accordance with one or more embodiments disclosed herein.

FIG. 7 schematically shows a method 100 of forming the CMC component 10, 50 according to the present disclosure, having one or more elongate functional features 40 defined therein, and more specifically, one or more cooling channels 42 formed within the plies of the CMC component. Component 10, 50 is formed using a lay-up technique. Method 100 includes initially forming a CMC preform comprising a matrix precursor, a plurality of ceramic reinforcing fibers and a plurality of sacrificial fibers, in a step 102. Forming the CMC preform includes initially providing a plurality of ceramic matrix composite plies 44, such as a series of plies 44 formed into a laminate stack. An example of material for plies 44 includes, but is not limited to, pre-preg composite plies including, for example, woven carbon fiber, binder material and coated SiC fibers, as previously described.

As previously described, the method, and more particularly step 102 of forming the CMC preform, includes a means for defining one or more elongate functional features within the plies 44, such as by using a plurality of sacrificial fibers. The sacrificial fibers enable the forming of the one or more elongate functional features 40 for enhancing the function of the CMC, such as one or more cooling channels 42 and/or the plurality of insulating channels 80 in the CMC preform. Fabrication of elongate functional features using sacrificial fibers are discussed in commonly assigned, U.S. Pat. No. 10,384,981, by D. Hall et al., entitled "Methods of Forming Ceramic Matrix Composites Using Sacrificial Fibers and Related Products," which is incorporated herein in its entirety and U.S. patent application Ser. No. 16/722,896, filed Dec. 20, 2019, filed simultaneously herewith, by D. Dunn et al., and entitled "Methods of Forming Ceramic Matrix Composites Using Sacrificial Fibers and Non-Wetting Coating", which is incorporated herein in its entirety. The geometry of the one or more elongate functional features 40 defined therein the CMC preform includes any suitable geometry including a rounded, curved, elliptical, rectilinear or other suitable geometry.

Additional plies 44 are disposed to enclose the sacrificial fibers. The preform component is placed in an autoclave and an autoclave cycle is completed to form the CMC preform comprising the matrix precursor, the plurality of ceramic reinforcing fibers and the plurality of sacrificial fibers. The preform component is subject to typical autoclave pressures and temperature cycles used in the industry for ceramic composite materials. Autoclaving pulls out any volatiles remaining in the plies and autoclave conditions can be varied depending on the ply material. After autoclaving, a burn-out method is performed to remove any remaining material or additional binders in the pre-form component. The burn-out method is generally conducted at a temperature of approximately 426-648° C. (approximately 800-1200° F.).

After burn-out, the preform component is placed in a vacuum furnace for densification, in a step 104. Densification is performed using any known densification technique including, but not limited to, Silicomp, melt infiltration (MI), chemical vapor infiltration (CVI), polymer inflation pyrolysis (PIP), and oxide/oxide methods. Densification can be conducted in a vacuum furnace having an established atmosphere at temperatures above 1200° C. to allow Silicon or other infiltrant materials to melt-infiltrate into the pre-form component. One suitable method of densification is melt infiltration wherein molten matrix material is drawn into the plies 44 and permitted to solidify. After densification, the densified preform component or densified body includes the plurality of sacrificial fibers disposed therein, as shown in step 104, and forms at least a portion of the component 10, 50.

Subsequent to densification, the one or more elongate functional features 40 are further formed by removing the sacrificial fibers, to leave one or more elongate channels, in a step 106. The removal of the sacrificial fibers to form the elongate channels is discussed in the above-referenced commonly assigned, U.S. Pat. No. 10,384,981 and U.S. patent application Ser. No. 16/722,896.

In an alternate embodiment, the one or more elongate functional features 40 are further formed by removing the plurality of sacrificial fibers prior to densification, as described in step 104.

In an embodiment, an internal hollow portion of each of the one or more elongate functional features 40 is sufficiently large and open in the component 10, 50 such that a coolant or other fluid can be directed therethrough to provide cooling, and optionally insulating, to component 10, 50. In an embodiment, during the layup of the sacrificial fibers, one or more fibers are laid up in a manner to form the inlet 48 for the input of the cooling fluid. The densified matrix material formed at the ceramic matrix composite ply 44 forms a blockage opposed to the inlet formation that substantially prevents flow of coolant or other fluids and more particularly, forms the one or more elongate functional features 40 as a closed structure at an end opposed to the inlet 48 that is internal to the component 10, 50. In an embodiment, openings are machined or otherwise formed into the component 10, 50, in a step 108, to provide outlets 46 to the one or more elongate functional features 40 to permit flow therethrough and form the cooling channels 42. In an embodiment, the blockage remains in place to form the one or more insulating channels 80, in a step 112. In an optional step 110, one or more film cooling throughholes 70 are formed in the CMC component 10, 50 to provide additional flow of a cooling fluid flow to the surface of the airfoil and provide additional cooling.

Accordingly, disclosed is a CMC component comprised of a CMC preform in which one or more functional features are formed. By forming the one or more functional features as described herein, a network of cooling channels, or a cooling circuit, is formed in the CMC plies, while limiting strength reduction of any given ply, and allowing the cooling channels to change orientation without cutting the CMC fibers. In addition, by forming the one or more functional features as described herein, a network of insulating channels, can be formed in the CMC plies. As previously indicated, the design of the cooling circuit provides greater robustness to recession and reduces thermal stresses by spreading out the cooling channels in the CMC preform. In addition, the incorporation of cooling channels provides a more uniform temperature distribution. The additional film cooling throughholes may be required to cool the surface sufficiently. The one or more functional features are formed in the CMC component during lay-up and aligned with the CMC fibers in a respective ply. In the simplest embodiment, the one or more functional features are aligned with the fibers, in a respective ply of a plurality of plies, that are arranged in alternating oriented plies. In more complex arrangements, the one or more functional features may form complex networks whereby the functional features are configured with one or more turns to connect to a respective platform or band, and/or configured to provide a single functional feature fluidly coupled to multiple outlets.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A ceramic matrix composite component, comprising:
a plurality of longitudinally extending ceramic matrix composite plies in a stacked configuration forming a densified body;
one or more elongate functional features formed therein the densified body, wherein each of the one or more elongate functional features includes an inlet configured to be in fluid communication with a flow of cooling fluid from a fluid source;
one or more bores cutting through the plurality of longitudinally extending ceramic matrix composite plies from at least a first one of the one or more elongate functional features to an outlet proximate to an outer surface of the ceramic matrix composite component to form at least one cooling channel,
wherein at least a second one of the one or more elongate functional features is configured to retain the flow of cooling fluid from the fluid source in the second one of the one or more elongate functional features to form an insulating channel; and
one or more film cooling throughholes cutting through the plurality of longitudinally extending ceramic matrix composite plies from an inner surface of the ceramic matrix composite component to an outlet proximate to the outer surface of the ceramic matrix composite component, the one or more film cooling throughholes in fluid communication with the flow of cooling fluid from the fluid source;
wherein the one or more functional features are formed during lay-up of the plurality of longitudinally extending ceramic matrix composite plies.

2. The ceramic matrix composite component of claim 1, wherein the one or more bores are formed via one or more of laser drilling, electrical discharge machining, cutting or machining the plurality of longitudinally extending ceramic matrix composite plies.

3. The ceramic matrix composite component of claim 1, wherein the one or more film cooling throughholes is formed via one or more of laser drilling, electrical discharge machining, cutting or machining the plurality of longitudinally extending ceramic matrix composite plies.

4. The ceramic matrix composite component of claim 1, wherein the ceramic matrix composite component is a hot gas path turbine component.

5. The ceramic matrix composite component of claim 4, wherein the hot gas path turbine component is selected from the group consisting of a combustor liner, a blade, a shroud, a nozzle, a nozzle end wall, and a blade platform.

6. The ceramic matrix composite component of claim 1, wherein the at least one insulating channel does not include an outlet proximate to the outer surface of the ceramic matrix composite component.

7. The ceramic matrix composite component of claim 1, wherein each of the one or more elongate functional features extend in a lengthwise direction defined by the ceramic matrix composite component.

8. The ceramic matrix composite component of claim 1, wherein the one or more elongate functional features are configured in multiple plies of the plurality of longitudinally extending ceramic matrix composite plies.

9. The ceramic matrix composite component of claim 1, wherein the ceramic matrix composite component is a hot gas path turbine component for a gas turbine engine, the gas turbine engine defining a hot gas path flow, wherein the insulating channel is not in fluid communication with the hot gas path flow.

* * * * *